United States Patent [19]

Derbyshire et al.

[11] 4,447,310

[45] May 8, 1984

[54] PRODUCTION OF DISTILLATES BY THE INTEGRATION OF SUPERCRITICAL EXTRACTION AND GASIFICATION THROUGH METHANOL TO GASOLINE

[75] Inventors: Francis J. Derbyshire, Ewing; Darrell D. Whitehurst, Titusville, both of N.J.

[73] Assignee: Mobile Oil Corporation, New York, N.Y.

[21] Appl. No.: 391,334

[22] Filed: Jun. 23, 1982

[51] Int. Cl.$^3$ .......................... C10G 1/00; C07C 1/00; C07C 27/06

[52] U.S. Cl. ................................ 208/8 LE; 585/733; 585/640; 518/703

[58] Field of Search ............. 208/8 LE; 585/733, 640; 518/703

[56] References Cited

U.S. PATENT DOCUMENTS

| | | | |
|---|---|---|---|
| 3,507,777 | 4/1970 | Hemminger | 208/86 |
| 3,997,424 | 12/1976 | Urquhart | 208/8 |
| 4,075,079 | 2/1978 | Long | 208/8 LE |
| 4,076,761 | 2/1978 | Chang et al. | 585/319 X |
| 4,138,442 | 2/1979 | Chang et al. | 208/11 LE |
| 4,159,237 | 6/1979 | Schmid | 208/8 LE X |
| 4,191,700 | 3/1980 | Lebowitz et al. | 208/8 LE |
| 4,222,845 | 9/1980 | Schmid | 208/8 LE |
| 4,222,846 | 9/1980 | Schmid | 208/8 LE |
| 4,331,529 | 5/1982 | Lambert et al. | 208/8 R |

OTHER PUBLICATIONS

Coal Processing Technology "Supercritical Extraction of Coal" Maddocks et al. C.E.P. Jun. 1979, pp. 49–55.
Development of a Process for the Supercritical Gas Extraction of Coal Whitehead National Coal Board Stoke Orchard, Cheltenham, England.

*Primary Examiner*—William G. Wright
*Attorney, Agent, or Firm*—Alexander J. McKillop; Michael G. Gilman; Charles J. Speciale

[57] ABSTRACT

A process for producing a wide slate of fuel products from coal is provided by integrating a methanol-to-gasoline conversion process with coal liquefaction and coal gasification. The coal liquefaction comprises contacting the coal with a solvent under supercritical conditions whereby a dense-gas phase solvent extracts from the coal a hydrogen-rich extract which can be upgraded to produce a distillate stream. The remaining coal is gasified under oxidation conditions to produce a synthesis gas which is converted to methanol. The methanol is converted to gasoline by contact with a zeolite catalyst. Solvent for coal extraction is process derived from the upgraded distillate fraction or gasoline fraction of the methanol-to-gasoline conversion.

17 Claims, 1 Drawing Figure

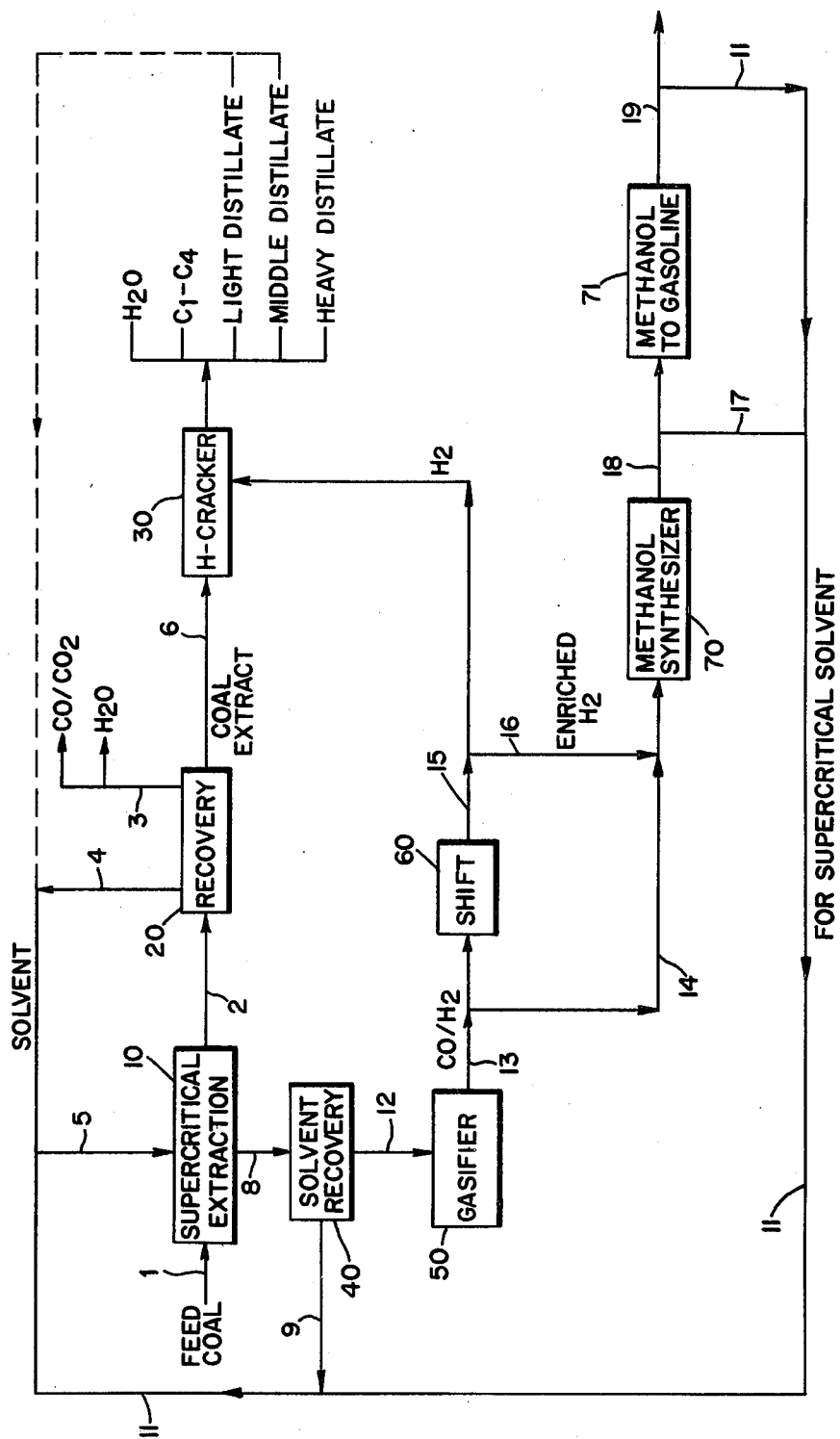

PRODUCTION OF DISTILLATES BY THE INTEGRATION OF SUPERCRITICAL EXTRACTION AND GASIFICATION THROUGH METHANOL TO GASOLINE

BACKGROUND OF THE INVENTION

1. Field of the Invention

This invention relates to processes for obtaining valuable fuel products from coal, and more particularly, relates to the integration of coal liquefaction and coal gasification so as to obtain a wide range of selected fuel products. Specifically, the invention relates to the processing of coal or other solid fuel products by solvent extraction of coal under supercritical conditions of temperature and pressure and coal gasification which are combined with a methanol-to-gasoline conversion process to produce a wide product slate of fuels.

Coal is becoming an increasingly attractive source for gaseous and liquid fuel inasmuch as coal is available in abundant supply and can be liquefied by a variety of techniques to produce a range of gaseous, distillate and nondistillate liquid coal products. It is recognized that the coal products may furnish a substitute for petroleum-based fuels and for petroleum-based feedstocks for the chemical industry.

It has also been well established that coal can be converted to gasoline by gasification of the coal and the subsequent production of methanol from the synthesis gas which is produced and the catalytic conversion of the methanol to gasoline. A ZSM-5 type zeolite catalyst has been found to be very effective in the conversion of methanol to gasoline. However, if a wide range of distillate products is desired from coal, the methanol-to-gasoline conversion process alone is not sufficient. Accordingly, a need exists to provide a wider product slate from coal than is ordinarily obtained from the methanol to gasoline conversion process. In accordance with the present invention, a wider product slate is obtained from coal by integrating the methanol-to-gasoline conversion process with coal liquefaction and coal gasification. As well, a very flexible, material and energy efficient coal conversion process is provided which allows greater selectivity as to the fuel products derived.

2. Description of the Prior Art

Deriving a gaseous and liquid fuel from coal utilizing integrated coal liquefaction and coal gasification is known to the art. For example, the selective extraction of hydrogen-rich constituents from coal using an organic solvent under supercritical conditions and gasification of the remaining charge is described by R. R. Maddocks et al "Coal Processing Technology: Supercritical Extraction of Coal", CEP, June, 1979. As described in the article, the chemical structure of the coal extract is such that it may be hydrocracked to distillable oils. The char or unextracted solid coal residue is described as an attractive feedstock for gasification and combustion and can provide the hydrogen required for extract hydrocracking, fuel gas for process heat and power, and surplus gas for electricity for sale.

A similar integrated process for deriving fuels from coal is disclosed in an article entitled "Development of a Process for the Supercritical Gas Extraction of Coal" by J. C. Whitehead, National Coal Board, Coal Research Establishment, Stoke Orchard, Cheltenham, England, 1979. In the article is described a process for deriving fuels from coal which includes the supercritical gas extraction of coal in which the extraction process is based on the ability of compressed gas to dissolve significant quantities of a high molecular weight substrate. The coal extract can be further hydrogenated. The article maintains that a variety of process options, in terms of processing routes and product slates, have been evaluated and that the majority of these options are based on the principal of generating power, process heat, and hydrogen from the residual solid char which remains after coal extraction. Any char excess to requirements in the schemes is converted to synthesis gas. Solvent make up for the supercritical gas extraction can be obtained from the products of extract hydrogenation.

U.S. Pat. No. 4,191,700, issued Mar. 4, 1980, to Lebowitz et al discloses a process for upgrading fuels, particularly coal, by means of integrating coal liquefaction and gasification and methanol synthesis. In this patent, coal is solvent refined with a conventional hydrogen donor solvent under severe conditions, preferably in a hydrogen environment, to convert substantially all the coal to a liquid product, which is divided in a vacuum still separation zone into a light distillate product, a recycle solvent, a heavy distillate, and a vacuum residue slurry. The vacuum residue slurry provides an efficient feed for a partial oxidation gasifier which produces synthetic gas as a feed for methanol and/or methane production and to supply hydrogen, as required, to the liquefier.

Although integrated coal liquefaction and coal gasification, as described above, is known and is used to derive a wide slate of fuel products from coal efficiently and with increased product selection, the integrated coal liquefaction and gasification processes, up to the present, have not fully utilized the char which remains after solvent extraction of the coal as described in the Maddocks et al and Whitehead articles or the heavy distillates and vacuum slurry separated from the coal conversion products as in the patent to Lebowitz et al to further increase the production of high value fuel products and optimize the ability to select which products are to be obtained from the coal. As set forth in the respective integrated processes discussed above, either the char which remains may be gasified to produce a synthesis gas or the vacuum residue slurry is converted to methanol or methane. The synthesis gas and methanol products are apparently used to provide heat for the respetive processes in which the excess products may be sold for heating value.

SUMMARY OF THE INVENTION

In accordance with the present invention, the methanol to gasoline conversion process is integrated with solvent extraction of coal and coal gasification to produce a broader slate of coal-derived fuel products with increased product selectivity along with improved overall material consumption and energy efficiency than has heretofore been obtained in previous coal conversion processes. It has been found that by combining solvent extraction of coal, coal gasification, the formation of methanol from synthesis gas and the conversion of methanol to gasoline, a very flexible operation is achieved whereby desired fuels from a wider coal-derived product slate can be obtained. Briefly, a hydrogen-rich coal extract is provided by solvent extraction of coal feed at supercritical conditions of temperature and pressure for the solvent using a low boiling gasoline fraction as solvent followed by separation of the solvent from the coal extract. The supercritical solvent extraction of the coal yields a low molecular weight distillate fraction which is rich in hydrogen. The extraction process does not require the consumption of hydrogen, and since the extracted coal product is of low molecular weight and hydrogen-rich, less hydrogen is required for extract upgrading than is needed when coal is excessively converted and the coal conversion products upgraded. The extracted coal product produced by the extraction process of the present invention is more reactive, easier to upgrade and requires less hydrorefining to remove nitrogen, sulfur and oxide compounds than do the coal products prduced by more severe coal conversion processes. Accordingly, there is a substantial savings in material consumption and energy requirements using the present process. The coal extract, after removal of the solvent, is subjected to hydrotreating or hydrocracking, the severity of which can be adjusted to obtain the product range desired. The upgraded coal extract is higher in aromatic content than is the gasoline product produced in the following manner from char gasification. The undissolved coal portion or reactive solid char which remains after supercritical extraction is gasified to produce a synthesis gas stream. The synthesis gas stream is used to generate hydrogen via the shift reaction in sufficient quantity to supply the hydrogen needed for coal extract upgrading and to adjust the $CO/H_2$ ratio for the formation of methanol. The methanol is then converted to gasoline by passing the methanol over a zeolitic catalyst. The low boiling gasoline fraction used as a solvent in the supercritical gas extraction of the coal can be derived from the gasoline components formed by upgrading the coal extract or from the gasoline formed from the methanol conversion process. Additionally, the middle range extract distillate or external sources of hydrogen-donor solvents; e.g. tetralin, hydroanthracene, can be used. Optionally, the methanol formed from the synthesis gas may be recycled and used as the extraction solvent. The gasoline produced from the methanol-to-gasoline conversion and the hydrocarbon stocks derived from upgrading the coal extract can be treated separately or co-processed to take advantage of their distinct compositions. The integrated coal liquefaction and gasification process of the present invention produces a wide variety of transport fuels and petrochemical feedstocks.

BRIEF DESCRIPTION OF THE DRAWING

The FIGURE is a diagrammatic view of a process according to the present invention.

DETAILED DESCRIPTION OF THE INVENTION

The process of the present invention is concerned with the efficient and economical production of a wide product slate from coal. It is contemplated that any suitable solid hydrocarbon fuel source can be used in this process. Common examples are lignites, bituminous coals, and sub-bituminous coals.

In carrying out the process of the present invention, the coal feed is contacted with a light solvent at supercritical conditions of temperature and pressure to produce a hydrogen-rich, low molecular weight coal extract and an undissolved residue from the extraction process comprising a solid porous char. The liquid coal extract is separated from the solvent which is recycled to the supercritical extraction zone. The liquid coal extract is then subjected to a hydrotreating or hydrocracking upgrading operation to produce gaseous fuel products as well as light, middle and heavy range distillate fractions. A low boiling gasoline or middle distillate fraction from upgrading may be used as the solvent in the supercritical solvent extraction of the coal feed. The char which remains after supercritical solvent extraction serves as a feedstock for an oxidation gasifier which provides a synthetic gas feedstock for methanol production via the well known water gas shift reaction which increases the hydrogen to carbon monoxide ratio. The synthesis gas produced by the gasifier is divided into two streams. The first stream undergoes a shift reaction to produce hydrogen gas which is partly supplied to the upgrading unit and partly blended back with the second synthesis gas stream. Blending additional hydrogen gas with the second synthesis gas stream adjusts the hydrogen to carbon monoxide ratio for optimal methanol synthesis. The hydrogen-enriched synthesis gas is then supplied to the methanol synthesizing zone. The methanol synthesizing zone produces methanol which is then converted to gasoline by passing the methanol over a zeolitic catalyst. A portion of the methanol and/or gasoline produced can be mixed with desired products from the upgrading unit to provide the solvent for supercritical solvent extraction.

In the first stage of the process, low molecular weight, hydrogen-rich constituents are extracted from the coal feed using a light gasoline solvent under supercritical conditions. Generally, the fuel source such as coal is dried, premixed with a solvent under ambient conditions (15°-25° C.) and reduced to particulate size by comminution. The premixing solvent comprises distillate product streams and originates from various sources within the integrated system of the present invention. Additional solvent from other sources may be added to the recycled premixing solvent if necessary. It is understood that coal-derived solvents are not mandatory in the premixing stage, although coal-derived solvents from the system are preferred to increase process efficiency. Any light aromatic stream is acceptable and need not necessarily be process derived. Examples are benzene-toluene-xylene (BTX) mixtures. In addition, petroleum-derived aromatics such as reformate streams or aromatic naphthas can be used as a make-up solvent when the solvent balance is difficult to achieve. In another mode of operation heavier hydrogen donor distillates derived from coal may be added as co-solvents to increase coal conversions. Such solvents include typical hydrogen donors as tetralin, hydrophenanthrenes, hydropyrenes, hydroquinolines, hydroanthracenes, partially saturated biphenyls and the like. This co-solvent stream is regenerated in the latter hydrogenative stages of the process.

The coal slurry feed is then solvent-processed under supercritical conditions to extract from the coal a liquid product richer in hydrogen and lower in heteroatom content than the original coal feed. The hydrogen rich coal extract should have a hydrogen content comprising about 6–8% by weight and preferably higher than 7%. In instances where higher conversions are desired the hydrogen content will be somewhat lower than from low conversion processes. Forming a coal extract rich in hydrogen and of low molecular weight increases the efficiency of upgrading and results in overall material (hydrogen) and energy savings. Thus, the amount of coal conversion is an important factor in achieving the benefits of the present invention.

The solvent which is used to extract the hydrogen-rich constituents from the coal under supercritical conditions is preferably one which is generated within the integrated process of the present invention; therefore, any small losses which may occur are not unduly detrimental. Alternatively, external solvents may be utilized including toluene among others. The supercritical solvent extraction of the present invention will take place at temperatures from about 350° to about 450° C. and preferably from about 370° to about 420° C. The coal feed is mixed with the solvent under supercritical conditions. The term "supercritical conditions" means that the solvent is in a dense gas phase state above its critical temperature. When a dense-gas solvent is at a temperature above its critical temperature, the solvent cannot be liquefied by the application of any degree of increased pressure. At the extraction temperature, the coal is thermally depolymerized to form low molecular weight liquids which are readily soluble in the dense-gas solvent phase. The gas phase taken from the supercritical extraction zone comprises a mixture of solvent and liquid coal extract at supercritical conditions. This gas phase is transferred to a separation zone where the coal extract can be recovered from the solvent by decreasing the pressure at which point the solvent power of the gas phase is reduced to an insignificant level and the light coal liquids are precipitated from solution. Small amounts of gas and water generated during the extraction step are removed after condensation of the solvent which is subsequently recycled to the supercritical extraction zone. The supercritical gas extraction process is further described in the Maddocks et al and Whitehead articles previously discussed. Further, U.S. Pat. No. 3,507,777, issued Apr. 21, 1970, to Hemminger also discloses extraction of a light oil from a coal feed at supercritical conditions.

An important aspect of the integrated coal liquefaction and gasification process of the present invention concerns the reaction time of the feed materials in the supercritical solvent extraction zone. The soluble feed material only needs to be contacted with the light solvent under supercritical conditions for a short time, preferably less than six minutes, in order to extract the more hydrogen-rich soluble coal products from the feed. Preferably about 20–40% by weight of the coal is solvent extracted. Only the lighter hydrogen-rich constituents are dissolved. The hydrogen-rich coal extract is characterized as containing less sulfur and nitrogen than the coal feed and is essentially free of mineral matter. When hydrogen donor solvents are included as co-solvents, higher conversions can be achieved, e.g., 50–80% depending on the type of coal, but the products will contain somewhat less hydrogen.

The hydrogen-rich coal extract leaving the supercritical extraction zone and separated from the solvent enters a hydrogenation zone where the extract is upgraded by hydrotreating or hydrocracking to produce a product slate comprising a small amount of water, $C_1$ to $C_4$ gaseous products, naphthas which are valuable for reforming gasolines, a good source of petrochemicals having about 95% naphthenes and aromatics which produce benzene, xylene, toluene and an acceptable process-derived supercritical solvent, middle distillate products which can be processed to produce acceptable diesel and jet fuels as well as supercritical solvent and some heavy distillate products. Preferably, the distillates can be divided into three fractions: the first fraction having a boiling range from an initial boiling point to 170° C., a second fraction boiling between 170°–300° C., and a third having a boiling point greater than 300° C. The adjustment of the product slate which is obtained is extremely flexible and can be controlled by the amount of extraction and the severity of the upgrading reaction and the amount of hydrogen donor present in the solvent. Accordingly, process conditions in the supercritical solvent extraction and upgrading zones are important but can be varied over a wide range to produce the desired hydrocarbon products. As mentioned previously, an advantage of extracting a hydrogen-rich material from the coal feed before upgrading is that the coal extract fed to the hydrogenator compared to the feed in most other coal liquefaction processes is richer in hydrogen and lower in molecular weight and metals content. Most probably, the coal extract feed can be effectively treated by various catalysts without incurring inordinate deactivation rates or excessive hydrogen requirements. Various hydrotreating or hydrocracking processes are known to the art and are contemplated within this invention. Briefly, the coal extract is upgraded in the presence of hydrogen and a catalyst under conditions suitable to convert the coal extract into the desired products.

The residue that remains after the hydrogen-rich extract has been taken from the feed coal is a solid porous char that is as reactive as coal and has a calorific content similar to that of the feed source. Particle size is not substantially altered by extraction. On heating, the residue does not cake nor evolve tar, the volatiles emitted consisting mainly of gas and water. Unlike normal pyrolitic techniques which generate a char residue with little volatile matter, the residue which remains after supercritical solvent extraction as discussed above retains much of the volatile content of the feed source.

The residual char is transferred from the supercritical solvent extraction zone and is employed as a feedstock for an oxidation gasifier. This type of gasifier which produces synthetic gas has been described extensively in the patent literature. Therefore, only a brief description of the gasification needs to be provided.

The residual char is fed to the oxidation gasifier and reacted with oxygen and steam in a closed reaction zone at an oxidation temperature within the range of about 1800° F. to 3000° F., usually about 2200° F. to 2800° F. The reaction zone pressure is generally about 300–1000 psig although higher pressures are possible. The products from the gasifier are principally carbon monoxide and hydrogen and include smaller amounts of carbon dioxide, methane and entrained carbon. The entrained carbon may be removed by conventional methods and recycled to the gasifier. The gas stream is split into two fractions. The first fraction is processed through the shift reactor and the second fraction is transferred to the methanol-to-gasoline conversion zone.

The well known water gas shift reaction may be used to increase the hydrogen:carbon monoxide ratio. In the shift process, the synthesis gas is contacted with water under conditions whereby carbon monoxide reacts with the water to produce hydrogen and carbon dioxide. The hydrogen rich stream is then split, a portion being directed to the upgrading unit to supply hydrogen to meet the reaction requirements of hydrotreating or hydrocracking the coal extract and the remaining portion being combined with the second synthesis gas fraction to provide at least the stoichiometric requirements for methanol synthesis. In the conversion of synthesis gas to methanol, it is preferred to adjust the hydrogen to carbon monoxide mole ratio to about 3:1. The gas stream can then be contacted with a catalyst to form methanol. An excellent summary of the art of gas manufacture, including synthesis gas, from solid and liquid fuels is given in the Encyclopedia of Chemical Technology, edited by Kirk-Othmer, 2nd edition, volume 10, pages 353–433, (1966), Interscience Publishers, New York, N.Y.

For the purposes of this invention, methanol is synthesized in any conventional manner known to the art. For example, the synthesis gas can be converted to methanol by passing the gas over a catalyst such as a catalyst which contains zinc and/or copper. The process operates at about 350°–600° F. and 700–2500 psig. Thermodynamic equilibria dictate operating at incomplete conversion with a synthesis gas recycle ratio of about 4 to 10. A portion of the methanol stream leaving the methanol synthesizer can be used as a makeup solvent for the supercritical solvent extraction zone.

The larger portion of methanol product leaving the methanol synthesizer is converted to gasoline by any conventional methanol-to-gasoline conversion process. Briefly, the methanol is contacted with a zeolite catalyst, such as a member of the ZSM-5 family of zeolites, to produce a narrow range high octane gasoline containing $C_4$–$C_{12}$ hydrocarbons. Typically the methanol is converted to aromatic gasoline over the zeolite catalyst as defined above, at about 500° to about 1200° F. and about 0.5 to 50 LHSV. U.S. Pat. Nos. 3,928,483 and 4,049,734 disclose processes of converting synthetic gas to methanol and methanol to gasoline, and are herein incorporated by reference.

The gasoline fraction leaving the methanol-to-gasoline conversion zone is also an ideal internally derived solvent for use in the supercritical solvent extraction zone. Additionally, the gasoline product which is derived broadens the product slate which is obtained from the overall integrated system.

For further understanding of the invention, the drawing will now be considered.

Coal feed and premix solvent are mixed and passed through line 1 to the supercritical solvent extraction zone 10 whereupon the coal feed is contacted with additional solvent under supercritical conditions. The additional solvent enters zone 10 via line 5. The hydrogen-rich coal extract in mixture with the solvent exits supercritical solvent extraction zone 10 at line 2 in the gas phase and enters recovery zone 20. In recovery zone 20, the pressure of the gas is lowered whereupon the solvent and liquid coal extract are separated. The solvent leaves recovery zone 20 via line 4 where it is cleaned before being recycled back through line 5 to the supercritical extraction zone 10. Additionally, surplus carbon monoxide and carbon dioxide gases as well as water leave recovery zone 20 via line 3.

The hydrogen-rich coal extract leaves recovery zone 20 via line 6 and enters upgrading zone 30. Upon either hydrocracking or hydrotreating, the hydrogen-rich coal extract is processed into a light gas stream and a distillate product ranging from light naphtha to a middle range distillate product which can be processed into an acceptable diesel and jet fuel and to a heavy distillate suitable for home heating fuel, marine diesel or utility boiler fuel. The light or middle distillate in one mode of operation can be recycled to the supercritical extraction zone 10 to increase the coal conversion.

The solid residual char which remains after extraction in supercritical extraction zone 10 leaves zone 10 via line 8 and enters solvent recovery zone 40 in which the solvent which remained with the residual char is recovered by a stripping process. Once the solvent is recovered, it can be recycled via lines 9, 11 and 5 to the supercritical solvent extraction zone 10 for further use therein.

The char residue then passes via line 12 to gasification zone 50 wherein the residue is reacted with steam and oxygen to produce a synthesis gas consisting principally of carbon monoxide, hydrogen and acid impurities ($CO_2$, $H_2S$, COS). The acid gas impurities can be removed by conventional methods. A portion of the synthesis gas produced in gasifier zone 50 is transported via lines 13 and 14 directly to the methanol synthesis zone 70. The remaining portion of the synthesis gas is shifted to form relatively pure hydrogen in the shift reactor 60. After conventional steps are taken to clean the hydrogen stream which leaves shift reactor 60 via line 15, the hydrogen stream is split. A portion of the hydrogen effluent flows directly to upgrader 30 to supply the hydrogen requirements therein. The remaining hydrogen is taken via line 16 and mixed with the synthesis gas in line 14 in order to provide the proper mole ratio of $H_2$/CO to form methanol in methanol synthesizer 70. A portion of the methanol produced leaves methanol synthesis zone 70 via line 17 and is directed to the supercritical extraction zone 10 via line 11 and can be used alone or in admixture with other process-derived solvents for use in the supercritical extracion of the coal feed.

A portion or all of the methanol product leaves methanol synthesis zone 70 via line 18 and enters methanol-to-gasoline conversion zone 71. In this particular reaction zone, the methanol is contacted with a zeolite catalyst to produce a relatively narrow range of high octane gasolines. The gasoline fraction exits through line 19 as a gasoline product or, alternatively, a portion may be recycled through lines 11 and 5 to supercritical extraction zone 10 as a process-derived solvent, either alone or in admixture with the other process-derived solvents. This gasoline fraction is an ideal solvent for use in the supercritical extraction of the hydrogen-rich coal extract.

In the above description, it should be understood that the key process steps have been described in their concept, and that one skilled in the engineering design of process plants would recognize engineering alternatives for carrying out the same process steps. In particular, it will be important to the overall economics of the process to efficiently recover energy (heat) from streams being cooled and to utilize this energy to offset other process requirements. The particular choice of such items will be apparent to one skilled in the art.

In the process of the present invention, coal is transformed into a number of high quality fuels and chemicals by means of an economical and efficient process. Rather than forming a synthesis gas directly from the coal and forming methanol and gasoline from the methanol to yield a high octane gasoline, the present process first extracts from the coal a light hydrogen-rich extract which yields economically valuable distillate fractions which with the gasoline produced in the methanol conversion process yield a wide slate of fuel and petrochemical products. At the present time, there is a conscious desire to conserve and use to the utmost efficiency world petroleum stocks. This has resulted in vast changes in the types of petro fuels which are utilized. The increased shift to diesel fuel is such an example. Accordingly, the wide product slate produced by the present invention is an improvement over converting all the coal to gasoline via the methanol-to-gasoline conversion process and even over the prior art cited herein wherein not all of the remaining residue was converted to high value fuels but was used to supply heat within the process. In addition, the process of the present invention provides the hydrogen required for upgrading of the coal extract. Additionally still, the solvent used to extract the hydrogen-rich coal extract in the supercritical gas extraction zone can be derived entirely from within the process if desired.

There are several other advantages of incorporating the methanol-to-gasoline conversion process within an integrated coal liquefaction and gasification process. The combination of the two fuel yielding processes imparts a greater overall efficiency than can be achieved by using either process alone for producing fuel products. As discussed above, the product slate which is obtained is much wider. Furthermore, the calculated thermal efficiency of the integrated process of the present invention is greater than 58% compared to the calculated efficiency of supercritical solvent extraction of the coal alone (53%) or the methanol-to-gasoline process alone (47%) when calculated on a comparable basis. A major portion of the overall savings and efficiency results from the greater efficiency of hydrogen use in upgrading the coal extract. Additionally, if all or a major portion of the solvent used in the supercritical gas extraction of the coal feed is process derived, the continuous integrated process of the present invention is much more efficient than can be expected.

For purposes of illustration, the following example demonstrates the product streams which are obtained by operation of the present invention.

EXAMPLE

Coal from the Wyodak Mine located in Campbell County, Wyo. was treated according to the process described above. The basis is 100 weight units of moisture, ash-free coal. Properties of the feed and effluent stream are shown in Table 1.

In the particular example given, hydrocracking was severe and the overall product obtained comprised 24.4 units of gasoline derived from methanol, 6.73 units of coal derived naphtha and 12.5 units of a light gas oil. The coal derived naphtha was very rich in naphthenes and aromatics (approximately 90% or higher).

What is claimed is:

1. An integrated process for the conversion of solid coal to a wide slate of fuel products comprising: extracting a portion of said coal by contacting said coal with an extraction solvent under supercritical conditions of temperature and pressure whereby said solvent is converted to a dense-gas phase capable of dissolving the coal, separating said solvent and a hydrogen-rich liquid coal extract, said coal extract having a hydrogen concentration greater than said solid coal, a portion of said solid coal remaining an unsolvated, solid coal residue, upgrading at least a portion of said coal extract in the presence of hydrogen to produce a plurality of upgraded fuel products, gasifying said residue under oxidizing conditions to produce a synthesis gas comprising hydrogen and carbon monoxide, shifting the hydrogen to carbon monoxide ratio of a portion of said synthesis gas to produce a hydrogen-enriched gas, combining said hydrogen-enriched gas with said synthesis gas, converting said combined gas to methanol, passing at least a portion of said methanol in contact with a catalyst capable of converting said methanol to gasoline products and recycling at least a portion of said gasoline products for use as said extraction solvent.

2. The process of claim 1 wherein said extraction solvent is additionally obtained from process-derived solvents, external solvents or mixtures thereof.

3. The process of claim 2 wherein said process-derived solvent is selected from the group consisting of solvent-derived from said upgraded fuel products, solvent derived from said methanol, and mixtures thereof.

4. The process of claim 3 wherein said solvent derived from said upgraded fuel products contains compounds capable of donating hydrogen.

5. The process of claim 1 wherein said extract is substantially free of solid matter.

6. The process of claim 3 wherein a portion of said extraction solvent is derived from an external source.

7. The process of claim 6 wherein said solvent derived from an external source comprises benzene, toluene, xylene, or mixtures thereof.

8. The process of claim 1 wherein said dissolved coal is separated from said extraction solvent by decreasing the pressure and temperature to a point whereby the liquid coal extract separates from said solvent.

9. The process of claim 1 wherein said liquid coal extract is catalytically upgraded in the presence of hydrogen.

10. The process of claim 1 wherein the hydrogen supplied for upgrading is provided from said hydrogen-enriched gas.

TABLE I

ANALYSIS OF STREAMS

| | Coal | Char | Extract | IBP-170 Ex H-Cracker | 170–300° C. Ex H-Cracker | Gas Ex-Supercritical % v/v Extraction | |
|---|---|---|---|---|---|---|---|
| dmmf Basis | | | | | | | |
| C | 74.8 | 84.3 | 82.9 | 86.7 | 87.5 | $H_2$ | 1.9 |
| H | 5.0 | 4.5 | 8.1 | 13.2 | 12.2 | CO | 6.0 |
| O | 18.7 | 9.4 | 8.1 | 0.4 | 0.8 | $CO_2$ | 74.8 |
| N | 1.15 | 1.5 | 0.8 | 0.08 | 0.15 | $CH_4$ | 13.6 |
| % M/C | 15.3 | 4.6 | — | — | — | $C_2H_6$ | 2.2 |
| % Ash | 6.1 | 11.0 | 0.08 | — | — | $C_3H_8$ | 0.86 |
| Calorific daf Value | | | | | | | |
| (BTU/lb) | 12,650 | 14,620 | 16,142 | — | — | $n\text{-}C_4$ | 0.03 |
| Viscosity | Solid | Solid | 2 cp at 250° C. | — | — | iso $C_4$ | 0.05 |
| Av Mol. Wt. | — | — | 330 | — | — | $C_2H$ | 0.19 |
| V.M % daf | 47.2 | 27.1 | — | — | — | $C_3H_6$ | 0.27 |

11. The process of claim 1 wherein said feed coal may be derived from the group consisting of lignites, bituminous coals and sub-bituminous coals.

12. The process of claim 1 wherein said feed coal is dried, premixed with a premixing solvent and comminuted before being liquefied.

13. The process of claim 12 wherein said premixing solvent comprises distillate oils.

14. The process of claim 13 wherein said premixing solvent is process-derived.

15. The process of claim 1 wherein said gasoline products are produced by contacting said methanol with a zeolite catalyst.

16. The process of claim 15 wherein said zeolite catalyst is ZSM-5.

17. The process of claim 1 wherein said coal extract contains at least 6% hydrogen by weight.

* * * * *